United States Patent Office 3,377,274
Patented Apr. 9, 1968

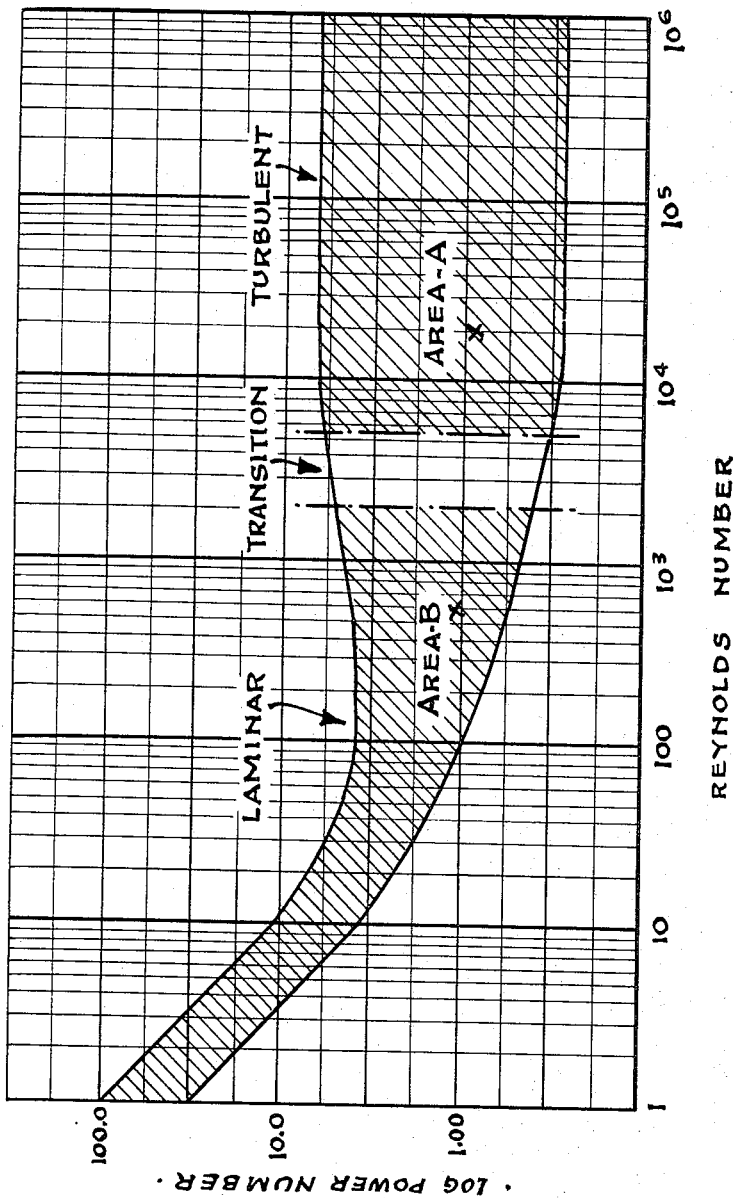

3,377,274
METHOD OF COAGULATION OF LOW TURBIDITY WATER
John T. Burke, La Grange, Mahmoud T. Dajani, Park Forest, and Theodore R. Schuh, Jr., Broadview, Ill., assignors to Nalco Chemical Company, Chicago, Ill., a corporation of Delaware
Filed Jan. 5, 1965, Ser. No. 423,540
9 Claims. (Cl. 210—53)

This invention relates to an improved method of coagulating suspended solids from aqueous liquids whereby such solids are quickly and efficiently removed. More specifically, the present invention is concerned with a process of optimizing efficiency of agglomeration and subsequent settling out of suspended solids from low turbidity waters.

Many types of aqueous liquids contain suspended solids which must be removed before these liquids are suitable for many industrial and potable applications. The types of aqueous liquids, the nature and concentration of the suspended solids, etc., vary greatly. A common method for removal of suspended solids from various types of aqueous liquids is via the well-known chemical process of coagulation. In the main, a method of coagulation usually comprises addition to the aqueous liquid to be treated of certain chemicals known as coagulants, mixing of chemical additive and aqueous liquid whereby floc formation occurs and subsequent removal of this floc by a variety of methods. The latter step may be effected by mechanical separation means or by merely allowing forces of gravity to work upon the agglomerated solids whereby a removable sludge layer is created.

One of the more difficult problems in coagulation technology is that involving treatment of low turbidity waters. Generally, these waters contain 15–30,000 p.p.m. of suspended solids. Waters containing suspended solids in excess of 30,000 p.p.m. are generally considered to fall within the class known as slurries.

Many types of common water supplies fall within the above classification of turbid water. For example, natural waters generally contain suspended solids within the above listed range. These solids are composed of both organic and inorganic matter such as clays, soaps, insoluble salts and oxides of inorganic compounds, as well as certain other materials of varying composition. River waters and lake waters are common examples of typical, naturally occurring bodies of water which oftentimes contain quantities of suspended solids within the low turbidity range. These waters must be treated to remove these solids if such waters are to be used for industrial process applications or as sources of potable water.

Many other low turbidity water types are aqueous suspensions which are synthetic in make-up. Typical examples of synthetic suspensions are various types of sewage waste which normally are collected in sewage plants and are concentrated by a coagulation and settling process. Other types of synthetic suspensions formed in aqueous liquids are those resulting from the processing of various types of ores in such industries as the uranium mining industry and copper mining industry. While the initial separation usually involves treatment of a slurry-type suspension, subsequent processing may be effected upon aqueous suspensions which fall within the low turbidity water range. Another type of synthetic suspension which is frequently formed is the suspension resulting from the washing of coal and the treating of certain steel mill wastes.

Rather specialized low turbidity synthetic suspensions are those formed in the softening of various types of water by the lime-soda softening process. By addition of lime and sodium carbonate to hard waters, it is possible to produce insoluble carbonates in the form of finely divided particles which will normally tend to slowly settle from the treated water. It is customary, therefore in many lime-soda softening operations to improve the overall efficiency of the process by adding coagulants to expedite the settling rate of the formed insoluble carbonates.

As mentioned above, the problem of causing rapid agglomeration and settling of suspended solids in low turbidity waters is difficult to overcome, at least in an efficient manner due to the inherent make-up of the aqueous liquids themselves. For example, low turbidity waters are frequently found to contain both turbidity and color, with the turbidity most frequently caused by particles of colloidal dimension which are extremely difficult to remove by conventional coagulation and settling techniques. Moreover, in many instances the floc formed due to reaction of the coagulant is small and is not of sufficient density to rapidly settle out. It is necessary, therefore, to wait for long periods of time before the floc is completely separated from the treated liquid by gravitational forces. It is therefore of current interest to accelerate this settling process in some manner.

Again, when improper coagulation techniques are practiced or chemicals employed of low effectiveness, it is commonly found that a certain percentage of the floc particles are light and instead of settling tend to gradually rise. Such floc, rather than being separated from the main body of water is subsequently released into the industrial process or potable water streams, creating an undesirable situation. For example, floc may cause or intensify corrosion problems if it is released into industrial process cooling waters.

In other situations of inefficient coagulation of low turbidity waters, a light, sticky floc is formed rather than the desired compact, dense masses of material. This results in a circumstance whereupon after long periods of accumulation in settling basins and like pieces of equipment, the sticky non-compacted masses of floc must be removed. Conventional blowdown operations adequately remove such accumulations of floc and other settled matter, but the disposal problem is difficult to control due to the voluminous nature of the matter being removed. Also, the cleaning of such equipment tends to be costly and time-consuming and frequently wastes valuable water to the detriment of process efficiency.

In some instances only relatively large quantities of coagulant build the floc into a size of sufficient density whereby it is capable of rapid settling. The unfavorable process economics in this case are apparent.

The just discussed problems and others frequently occur in processing of sewage. In many instances, even with benefit of chemical coagulants, voluminous, sticky, odoriferous masses are formed in commercial sewage equipment and must be removed by some type of cleaning process. Also, using conventional coagulation techniques, floc formation is slow and/or incomplete.

Recently, it has been proposed that the above discussed problems of separation of finely divided solids from aqueous low turbidity water suspensions be obviated by use of a combination of chemicals comprising both an anionic chemical and one cationic in nature. Such a solution to the problem of inefficient coagulation of low turbidity waters is tendered in Canadian Patent 637,703. However, it has now been discovered that even with use of a combination of such chemicals further process variables must be followed to reach optimum efficiency of coagulation of turbid waters. To achieve efficiency of operation in terms of clarity of supernatant liquid concomitant with rapid rate of sedimentation, certain coagulation process techniques must be carefully carried out. In view of the above, it therefore becomes an object of the invention to provide an improved method of coagulation.

A more specific object of the invention is to provide a method of optimizing the efficiency of coagulation of low turbidity waters.

A still further object of the invention is to provide a method of clarifying sewage by flocculation and settling of the finely divided solids suspended in the aqueous sewage waters. Other objects will appear hereinafter.

In accordance with the present invention, it has been discovered that the efficiency of coagulation of low turbidity waters may be optimized by carrying out the following process details. In its broadest aspects, the invention comprises treatment of the turbid water with a combination of chemical additives in a certain definite sequence, with each chemical additive step being followed by subjection of the thus treated turbid water to hydraulic flow of a specific character. More specifically, the process of the invention comprises the sequential steps of first adding in at least a sufficient dosage to initiate coagulation a chemical additive having at least one site of cationic charge to a low turbidity water having suspended therein 15–30,000 p.p.m. of solids. The thus cationically-treated water is then subjected to a zone of turbulent flow as defined by the parameters of the graph of the accompanying drawing and specifically by the points lying within Area A. Following the above steps, a second chemical additive is then added to the already treated or pre-treated turbid water. This second chemical should possess at least one site of anionic charge. To complete the coagulation, the partially coagulated water having been both cationically and anionically treated is then subjected to a situation of laminar flow as designed by the parameters of the graph of the drawing and more particularly by those points lying within Area B. The thus coagulated solids are then separated from the clarified water by a variety of known methods including gravitational separation.

For a better understanding of the invention, the reader's attention is drawn more particularly to the accompanying graph of the drawing. It has been discovered that sequence of addition comprising first addition of cationic material followed by addition of anionic as well as the type of flow to which the cationically-treated and anionically-treated waters are subjected are extremely important variables, which concepts form the basis of the instant invention. If reverse addition is followed, that is, anionic treatment followed by cationic treatment a situation of surprisingly less coagulation efficiency is found to occur. Likewise, if the cationically-treated water is subjected to laminar flow rather than turbulent flow or the anionically-treated water subjected to turbulent flow rather than laminar flow, again in each instance situations of relatively poor efficiency of coagulation operation are noted. It should also be pointed out that subjecting the turbid water to a combination of cationic and anionic coagulants within the defined transition flow zone of the graph lying between the turbulent and laminar flow areas also results in poor overall coagulation efficiency with slow formation of floc, as well as poor separation of suspended solids from aqueous suspending liquid. The above assertions will be borne out hereinafter by presentation of experimental work.

With respect to the parameters of the graph defining the proper flow, by definition, Power number is defined as $$\frac{Pg_c}{\rho N^3 D^5}$$

and Reynolds number is $$\frac{ND^2}{\mu}$$

where $g_c$ is a gravitational constant (32.2 ft./sec.$^2$), P is power (ft.-lb./sec.), $\rho$ is density of the aqueous liquid (lbs./ft.), D is diameter of impeller (ft.) and $\mu$ is viscosity of liquid (lb./ft.-sec.). Thus one skilled in the art in following the instant invention and knowing that the cationically-treated water must be subjected to turbulent flow as defined in the graph as a point falling within shaded Area A need only choose some Power number and Reynolds number falling within said area and calculate from the above the power needed to effect proper flow. The remaining variables including characteristics of fluid being subjected to coagulation as well as motor variables are easily measurable, depending upon the particular liquid and system of creating flow. Thus, for example, by knowing the Power number and Reynolds number necessary to create the desired flow one can calculate the revolutions per minute necessary to create this flow by an impeller type of movement of liquid.

In like manner, if air agitation is the desired method of creating flow, it has also been determined that $N^3D^5$ in the Power number definition equation above becomes (cu. ft./minute)$^3$/ft.$^2$ as a total area function. Since air agitation is generally somewhat less efficient than an impeller type on a volume displacement basis, a power factor curve for an inefficient impeller system could be used and again calculation of required power input carried out by reference to Reynolds and Power number points falling within Area A. The same type of procedure can be carried out to achieve proper laminar flow by reference to Area B of the graph.

It is understood of course, that required flow of laminar or turbulent type can be achieved by use of conventional agitation equipment. Such devices as air bubbling, baffles, pumping, hydraulic flow through obstacles of any type or even merely through a container as relatively high flow through a narrow diameter pipe or unit container, etc., may be employed. It is extremely important though that the cationic treatment be followed by turbulent flow, which sequence should be followed by anionic treatment and laminar flow.

Theoretical mathmatical calculations have confirmed what has been determined experimentally, that is, relation of Power number of Reynolds number is a function of system parameters. The following equation shows this relationship as a generalized system.

$$\frac{Pg_c}{\rho N^3 D^5} = K\left(\frac{\rho N D^2}{\mu}\right)^a \left(\frac{N^2 D^2}{g_c}\right)^b \left(\frac{T}{D}\right)^c \left(\frac{Z}{D}\right)^d \left(\frac{C}{D}\right)^e \left(\frac{P}{D}\right)^f \left(\frac{W}{D}\right)^g \left(\frac{I}{D}\right)^h \left(\frac{N_2}{N_1}\right)^i$$

where:

$$\frac{Pg_c}{\rho N^3 D^5} = \text{Power number}$$

$$\frac{ND^2}{\mu} = \text{Reynolds number}$$

and:

$g_c$=gravitational constant (32.2 ft./sec.$^2$)
$\rho$=density (lbs./ft.$^3$)
$N$=revolutions/minute (minutes)
$D$=diameter of impeller (ft.)
$\mu$=viscosity—(lb./ft.-sec.)
$K$=constant
$T$=tank diameter—(ft.)
$Z$=liquid depth—(ft.)
$C$=height of impeller from tank bottom—(ft.)
$P$=power—(ft.-lb./sec.)
$W$=impeller blade width—(ft.)

The plot of Power number versus Reynolds number shows good correlation over a wide range and for all types of mixing within the scope of the invention.

At Reynolds numbers less than 10, mixers are operating in a viscous range regardless of the type and while the actual value of the power factor at given Reynolds number will vary, the slope remains unchanged. Between Reynolds number of 10 and 5,000 the slope can be positive, negative or zero. Up to a Reynolds number of about 2,000 the slope is usually positive and the mixing is generally laminar.

In this case where no vortex is present, the correlation curves can be represented by:

$$\frac{Pg_c}{\rho N^3 D^5} \alpha \left(\frac{D^2 N}{\mu}\right)^m \qquad (1)$$

where $m$ is the slope of the curve at any point and the Reynolds number is less than 2,000.

At a Reynolds number above 5,000 the mixing is generally turbulent, and with no vortex present the slope is always zero and again the actual Power number may vary but not the slope.

Since the slope $m$ in the turbulent region is 0, Equation 1 reduces to:

$$\frac{Pg_c}{N^3 D^5} = K_t \qquad (2)$$

where $K_t$ is a proportionality constant. However, $K_t$ is the value of the Power number in the turbulent region since it is the intercept at the y-axis, and Equation 2 can be rewritten as:

$$P = (K_t/g_c) N^3 D^5 P \qquad (3)$$

This shows that power consumption is proportional to $N^2 D^5$ and fluid density. Consequently power requirements are independent of viscosity in this range and changes in viscosity have no effect on power requirements as long as the Reynolds number is greater than 5,000.

An equation similar to 3 can be derived from Equation 1 for the viscous flow region where the slope is always negative and equal to $-1$, $$\frac{Pg_c}{\rho N^3 D^5} = K_v \frac{(D^2 N \rho)}{\mu} - 1 \qquad (4)$$

Using the power factor for $K_v$ at the y-axis intercept where Reynolds number equals 1; Equation 4 reduces to:

$$P - (K_v/g_c)(N^2 D^3)\mu \qquad (5)$$

This relation shows that power consumption is proportional to $N^3 D^5$ and fluid viscosity and is independent of fluid density. In cases where the slope $m$ is not $-1$ this same relation is still valid; only the exponents are changed and the density now plays only a very small part. Generally this is small enough to be neglected.

Since the slope $m$ is not constant in the transition range, the same generalizations cannot be made. It is then necessary to resort to a Power factor/Reynolds number plot. Such plots, however, are unreliable and cannot be interchanged from liquid to liquid or from equipment to equipment except by tedious trial and error technique which is extremely time-consuming and non-acceptable for economic reasons. Thus, use of flow rates within the transition zone of the graph falls without the scope of the invention, and, as will be seen later should be avoided in its practice. It is obvious from the above that proper Reynolds and Power numbers are of prime importance where coagulation operations are to be efficiently carried out.

Correct definition of flow as particularly limited by proper Reynolds and Power numbers as well as proper sequence of addition of chemical followed by the distinctive class of flow as discussed above are essential to achieve formation of optimum coagulation of turbid waters.

Optimum dosage of each of the chemical coagulants for any particular class of low turbidity waters and for those members within the class is generally determined by experimentation. The amounts of the polymeric agents will vary widely depending upon the natures of the suspended solids and the aqueous media, pH of the suspension, size distribution, and amount of finely divided solids etc. Generally, however, we have discovered that for best results 0.05–100 p.p.m. of cationic coagulant should be employed. On the other hand, the anionic coagulant-inducing compound should range from about 0.05 to about 25 p.p.m. It is understood, of course, that in certain practices of the invention the amounts of both the anionic and cationic coagulants may vary somewhat outside the just stated ranges.

CATIONIC COAGULANTS

As is discerned from the discussion above, a wide variety of cationic treating agents, inorganics, polymeric organic and those organics without recurring units, may be suitably employed in the invention. Generally, such materials usually have sufficient strength of ionization to form salts with alkali cations in aqueous media. The following materials are just a few of the typical cationic substances which may be suitably employed in practice of the invention.

One preferred cationic class of materials is a polymeric polyamine substance. Generally these polymers have molecular weights in excess of 1,000 and more preferably in excess of 2,000. The most preferred polymers of this type have molecular weight ranges of 2,000–50,000. Such above polymeric polyamines may be formed by a wide variety of reactions such as by the reaction of alkylene polyamines and difunctional alkyl materials.

A greatly preferred class of polyamine polymers are condensation polymers of alkylene polyamines and halohydrins. Examplary polymers of this type are those disclosed in Green U.S. Patent 2,969,302, the disclosure of which is incorporated herein by reference.

A preferred polyamine condensation polymer of the type described in Green U.S. Patent 2,969,302, is generically defined as an aqueous solution containing 5–40% by weight of a high molecular weight epihalohydrin-alkylene polyamine condensation copolymer, said aqueous solution being further characterized has having a viscosity of at least 10 cps., when measured as an aqueous solution containing 20% by weight of said condensation copolymer at 75° F. Preferred materials falling within this class have a viscosity of at least 50 cps. when measured as just described. The upper limit of the viscosity is anything short of gel formation. Most preferred products have viscosities of from about 50 to about 800 cps. In order to form the preferred polymers of the invention, it is only necessary to polymerize the epihalohydrin and alkylene polyamine at temperatures ranging from about 105° F. to 185° F. at a mole ratio of epihalohydrin to alkylene polyamine falling within the range of 1.4:1 to 2.2:1. For best results the polymerization reaction is generally carried out in dilute aqueous solutions at reactant concentrations ranging from about 10 to about 30% by weight.

As mentioned above, the two classes of monomeric reactants involved in the condensation polymerization are epihalohydrins and alkylene polyamines. The epihalohydrins that may be employed include such materials as epichlorohydrin, epibromohydrin, and epiiodohydrin. Of these, the most preferred, due to cost and ready availability, is epichlorohydrin.

The alkylene polyamines which are reacted with the polyfunctional halohydrin for the purpose of the invention are well-known compounds having the general formula:

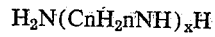

where $n$ is an integer from 1 to 4 and $x$ is one or more. Preferably, $n$ is 2 and $x$ ranges from 1 to 5 to give the preferred polyethylene polyamine class. Examples of alkylene polyamines useful in the invention are the alkylene diamines, such as ethylene-diamine, 1,2-propylene diamine, 1,3-propylene diamine and the polyalkylene polyamines, such as, for example, diethylene triamine, triethylene tetramine, tetraethylene pentamine, pentaethylene hexamine, dipropylene triamine, and the similar polypropylene polyamines and polybutylene polyamines.

Mixtures of any of the above may also be used and oftentimes commercial sources of these compounds contain two or more of any of the above alkylene polyamines. Some commercial amine products may contain mixtures of as many as five separate compounds.

Yet another species of polyamines falling within the above class is formed by reaction of an alkylene dihalide and an amine. Preferred amine reactants include ammonia, ethylene diamine, diethylene triamine, tetraethylene pentamine and triethylene pentamine. Of these, the most preferable due to excellent reactivity, low cost and availability is ammonia. The alkylene dihalide reactant may be chosen from a wide variety of difunctional organics including ethylene dichloride and 1,2-propylene dichloride. Of these the most preferred is ethylene dichloride. One excellent cationic polymer for use in the instant invention is formed by reaction of ammonia and ethylene dichloride under super-atmospheric pressures and with heating. A method for preparing these polymers is disclosed and claimed in a copending application assigned to a common assignee, said application being filed on July 18, 1966, having Ser. No. 565,751. The disclosure of this application is incorporated herein by reference.

In addition to the above preferred condensation type polymers, many other condensation polymeric cationics are also admirably suited for use in the invention. Effective water-soluble cationic polymers or resins are to be found among the class consisting of amine-aldehyde resins and amide-aldehyde resins, preferably hydrophilic melamine-formaldehyde resins. Such colloidal cationic resin solutions may be prepared by dissolving ordinary melamine-aldehyde condensation products, such as methylol melamines, in acids such as hydrochloric acid, to form acidified or acid-type resin solutions having a glass electrode pH value within the range of about 0.5 to about 3.5 when measured at 15% solids, or pH values up to 4.5 when measured in more dilute solutions, followed by aging to the colloidal condition, as described in U.S. Patent 2,345,543.

Another class of cationic melamine-aldehyde resins that may be used in practicing the present invention are the resinous polymers of melamine, urea and aldehydes such as formaldehyde containing at least 0.7 mole of melamine for each 4 moles of urea and about 1 to 4 moles of combined formaldehyde for each mole of melamine plus urea. Such resins are described in U.S. Patent 2,485,079. These cationic melamine resin copolymers are obtained by first preparing an acidified aqueous solution of an aldehyde condensation product of melamine and urea containing 1 to 70 mole percent of urea and 30 to 99% of melamine and about 0.2 to 1.5 moles of acid per mole of melamine, depending on the strength of the acid, and aging the solution until the colloidal cationic condition is reached.

Another suitable class of cationic coagulants are those of the polyimine type. The polyimines are derived, for example, by the homopolymerization of monomers containing the imino radical,

and have a molecular weight of at least 1000.

The imine monomers preferably employed contain not more than 7 carbon atoms. Of the monomers employed for making polyimines, some of those best suited for the purpose of the invention are classified as substituted ethyleneimines and have the structural formula:

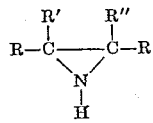

wherein R, R', R'' are either hydrogen or acyclic hydrocarbon radicals containing from 1 to 3 carbon atoms.

Examples of such monomers are the following:

(A) Ethyleneimine—

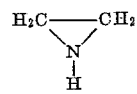

(B) 1,2-propyleneimine—

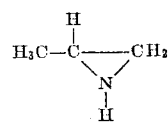

(C) 1,2-butyleneimine—

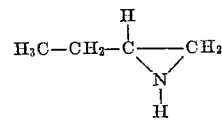

(D) 2,2-dimethylethyleneimine—

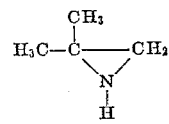

(E) 2,3-butyleneimine—

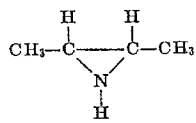

(F) 1,1-dimethyl, 2-n-propylethyleneimine—

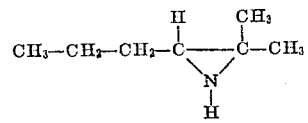

Other monomers capable of producing cationic polymers suitable for the practice of this invention are trimethyleneimine which has the structural formula:

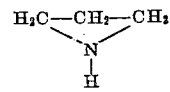

and its lower alkyl substituted derivatives in which one or more of the hydrogen atoms attached to a carbon atom is substituted by an alkyl group containing not more than 3 carbon atoms, i.e., methyl, ethyl, and propyl.

Ethyleneimine, as well as many of its derivatives, may be prepared by any of several well-known methods such as are described in the "Journal of American Chemical Society," vol. 57, p. 2328, (1935), and Ber., 21 1094 (1888).

The polymerization of ethyleneimine and its derivatives is usually conducted at reduced temperatures using acid catalysts such as HCl and the like. The polymerization of the various monomers listed above is described in detail in the "Journal of Organic Chemistry," vol. 9, p. 500 (1944).

The linear polyimines are characterized by a long acyclic chain structure in which nitrogen atoms of imine groups are connected at intervals to carbon atoms. It will be recognized, therefore, that linear polyimines can be prepared not only by homopolymerization but also by condensation reactions with the elimination of a hydrohalide. Thus, ethylene dibromide or propylene dibromide can be condensed with diethylenetriamine, triethylenetetramine, tetraethylenepentamine, and/or dipropylenetriamine to produce polyimines, and the present invention contemplates the employment of such materials as coagulants.

In general, the polyimines employed in the practice of the invention can be described as water-soluble polyimines in which imino (—NH) groups are attached to carbon atoms and recur every two to three atoms in a main linear chain, preferably containing not more than 6 carbon atoms in any side chain. Where imino groups are separated from each other by ethylene groups, the linear polyimines are referred to as polyethyleneimines. Where the imino groups are separated from each other by propylene groups, the linear polyimines are referred to as polypropyleneimines.

The molecular weight of the useful imine polymers should be at least 1,000 and is preferably from 5,000 to 50,000. If the condensation reactions from which these polymers are derived are allowed to continue for too long a period of time or the conditions are not suitable, infusible, water-insoluble resins may result. In the case of 2,2-dimethylethyleneimine, care must be used to control the reaction so that the materials produced are sufficiently water-soluble so that they can be employed at effective concentrations. Similarly, long chain water-soluble cationic polymers may be prepared by condensing formaldehyde with a polyalkylene polyamine such as tetraethylenepentamine to link the polyamines with a plurality of methylene bridges.

The above type condensation polymers may be generally described as water-soluble cationic polymers containing a plurality of cationic sites in a straight or branched chain configuration. In addition to these cationic polymers, other suitable organic cationic coagulants may be used in practicing the invention. Of these, the most important is a class of compounds known generally as onium compounds. These onium compounds useful as coagulants are generally described as alkyl or aralkyl substituted quaternary onium compounds containing at least one acyclic hydrocarbon group of at least 9 carbon atoms in chain length.

The cationic substituted quaternary onium compounds and their use as coagulants are described in U.S. Patent 2,236,930, the disclosure of which is incorporated herein by reference. The preferred quaternary onium compounds are the quaternary ammonium compounds. Several commercially available quaternary ammonium compounds are: soya trimethylammonium chloride, dimethyl ammonium chloride, tallow trimethyl ammonium chloride, lauryl trimethyl ammonium chloride, stearyl trimethyl amomnium chloride, and coconut trimethyl amomnium chloride. These compounds are manufactured and sold by the Armour Chemical Division under the tradename "Arquads."

Other cationic chemical coagulants include those of the inorganic type such as aluminum sulfate (alum) ferrous sulfate, chloronated copperas (chlorine-oxidized ferrous sulfate), ferric sulfate, ferric chloride, sodium aluminate, etc. Of these, the most preferred substances are alum, sodium aluminate, ferrous sulfate, and ferric chloride. A typical sodium aluminate is a high purity sodium aluminate as produced by the method of Walker, U.S. Patent 3,002,809, the disclosure of which is incorporated herein by reference. Sodium aluminate products of around 99% purity have a $Na_2O:Al_2O_3$ molecular ratio from 1.11:1 to 1.25:1 as produced by this method.

Still other suitable cationics include cationic starch which is generally formed by reaction of starch with a suitable amine-containing material whereby an amino alkoxy group is produced.

Yet another class of cationic coagulants include addition-type polymers which in aqueous medium will form organic cations having a substantial number of positive charge distributed at a plurality of positions on the polymer. Generally, these materials have a molecular weight in excess of 100,000 and contain in a side chain a hydrophilic group possessing the ability to form the above described positive charge. Typical members of this group are polyvinyl pyridine or other similar monomers having nitrogen-containing nuclei. Another specific material of this type is polyvinyl pyrrolidone. Salts of the above may also be employed.

Still other suitable cationics include the well-known vinyl benzyl quaternary ammonium compounds such as the homopolymers of vinyl benzyl quaternary ammonium salts or copolymers thereof formed by a copolymerization reaction with acrylamide, methacrylamide, etc. The vinyl benzyl quaternary materials are generally formed by chloromethylating polystyrene and subsequently substituting the chloro group with a teriary amine to produce the corresponding nitrogen quaternary.

Other examples of cationic polymers suitable as a treating agent in the first step of the process of the invention includes homopolymers and water-soluble copolymers of aminoethyl acrylate hydrochloride, aminoethyl methacrylate hydrochloride, or substituted ammonium alkyl acrylates or methacrylates such as N-methyl or N-N-dimethyl-aminoalkyl acrylate or methacrylate wherein the alkyl groups contain 2–3 carbons or suitable materials. Other cationic polymers may be formed when the cationic monomer of the type just described is copolymerized with any one or more mono-ethylenically unsaturated monomers capable of vinyl polymerization such that the resulting copolymer is water-soluble or water dispersible. Suitable monomers of this type which may be copolymerized with the cationic monomers include acrylamide, methacrylamide, acrylonitrile, the lower alkyl esters of acrylic and methacrylic acids, vinyl methyl ether, etc.

The above list of materials are just a few of the available cationic coagulants which may be suitably employed in the practice of the instant invention. It is understood, of course, that other cationic substances may be used other than those listed above without departing from the scope of the invention.

ANIONIC COAGULANTS

Coagulants falling within the anionic class are those consisting of substances which in an aqueous medium will form organic anions having a measurable negative electric charge. Greatly preferred anionic materials are those substances polymeric in nature having a substantial number of negative electrical charges distributed at a plurality of positions on the polymer. These polymeric anionic substances generally have a molecular weight of at least 100,000 when formed as addition-type polymers or copolymers are derived by polymerization of at least one mono-olefinic compound through an aliphatic unsaturated group. These polymers should be water dispersible and have a structure substantially free of cross linkage and are therefore available for solubilization or dispersion in the particular aqueous turbid liquid being treated. Preferred anionic substances found to be especially effective for the purpose of the invention are water dispersible synthetic polymers having a linear hydrocarbon structure and containing in a side chain a hydrophilic group selected from the class consisting of carboxylic acid, carboxylic acid anhydride, carboxylic acid salt groups, and copolymers of any of the foregoing. Typical water-dispersible synthetic organic polymers, anionic in nature, which have these characteristic groupings are listed below. These have been found to be effective for the practice of the invention.

| Number | Name | Characteristic Grouping |
|---|---|---|
| 1 | Polyacrylate-sodium salt | $-CH_2-CH-$ <br> $\quad\quad\quad\ \ |$ <br> $\quad\quad\quad\ COO(-)$ <br> $\quad\quad\quad\ \ Na(+)$ |
| 2 | Polymethacrylic acid-sodium salt | $\quad\quad\quad\ CH_3$ <br> $\quad\quad\quad\ \ |$ <br> $-CH_2-C-$ <br> $\quad\quad\quad\ \ |$ <br> $\quad\quad\quad\ COO(-)$ <br> $\quad\quad\quad\ \ Na(+)$ |
| 3 | Maleic anhydride-vinyl acetate copolymer | $-CH-CH_2-CH----CH-$ <br> $\ \ |\quad\quad\quad\quad\ O=C\ \ \ \diagdown C=O$ <br> $\ \ O\quad\quad\quad\quad\quad\quad\ \diagdown O \diagup$ <br> $CH_3C=O$ |
| 4 | Polyvinyl methyl ether-maleic anhydride copolymer | $-CH----CH_2-CH----CH-$ <br> $\ \ |\quad\quad\quad\quad\ O=C\ \ \diagdown C=O$ <br> $\ \ OCH_3\quad\quad\quad\quad\ \diagdown O \diagup$ |
| 5 | Methacrylic acid-acrylamide copolymer | $\quad\ CH_3\quad\quad\quad CH_3$ <br> $\quad\ \ |\quad\quad\quad\quad\ \ |$ <br> $-CH_2C----CH_2---C-$ <br> $\quad\ \ |\quad\quad\quad\quad\ \ |$ <br> $\ \ COO(-)\ \ \ CONH_2$ <br> $\ \ H(+)$ |
| 6 | Polyacrylic acid | $-CH_2-CH-$ <br> $\quad\quad\quad\ \ |$ <br> $\quad\quad\quad\ COO(-)$ <br> $\quad\quad\quad\ \ H(+)$ |
| 7 | Isopropenyl acetate-maleic anhydride sodium salt | $\quad\ CH_3$ <br> $\quad\ \ |$ <br> $CH_2-C----CH----CH$ <br> $\quad\ \ |\quad\quad\quad\ C=O\ \ \ C=O$ <br> $\quad\ \ O\quad\quad\ \ \ |\quad\quad\ |$ <br> $CH_3C=O\ \ O(-)\ \ O(-)$ <br> $\quad\quad\quad\quad\ Na(+)\ \ Na(+)$ |
| 8 | Itaconic acid-vinyl acetate | $\ COO(-)H(+)$ <br> $\ \ |$ <br> $-C-CH_2----CH_2-CH-$ <br> $\ \ |\quad\quad\quad\quad\quad\quad\ |$ <br> $\ CH_2COO(-)\quad\quad\ O$ <br> $\ \ H(+)\quad\quad\quad\ CH_3C=O$ |
| 9 | α-Methyl styrene-maleic anhydride sodium salt | $\quad\ CH_3$ <br> $\quad\ \ |$ <br> $\ C-CH_2-CH----CH-$ <br> $\ |\quad\quad\quad\quad\ |\quad\quad\ |$ <br> $\text{(phenyl)}\ COO(-)\ COO(-)$ <br> $\quad\quad\quad\ Na(+)\ \ Na(+)$ |
| 10 | Styrene-maleic anhydride sodium salt | $-CH-CH_2-CH----CH-$ <br> $\ |\quad\quad\quad\quad\ |\quad\quad\ |$ <br> $\text{(phenyl)}\ COO(-)\ COO(-)$ <br> $\quad\quad\quad\ Na(+)\ \ Na(+)$ |
| 11 | Methylmethacrylate-maleic anhydride sodium salt | $\quad\ CH_3$ <br> $\quad\ \ |$ <br> $-C----CH_2-CH----CH-$ <br> $\ |\quad\quad\quad\quad\ \ |\quad\quad\ |$ <br> $\ COOCH_3\ COO(-)\ COO(-)$ <br> $\quad\quad\quad\quad\ Na(+)\ \ Na(+)$ |
| 12 | Acrylic acid-styrene copolymer | $-CO-CH_2-CH-CH_2-$ <br> $\quad\quad\quad\quad\ \ |$ <br> $\quad\quad\quad\quad\ \text{(phenyl)}$ <br> $\quad\quad\quad\ COO(-)$ <br> $\quad\quad\quad\ \ H(+)$ |

A suitable anionic copolymer may be derived from a polycarboxylic acid monomer and at least one other monomer copolymerizable therewith. The polycarboxylic acid may be maleic anhydride, acrylic acid, maleic acid, fumaric acid, itaconic acid, aconitic acid, citraconic acid, etc., which may be copolymerized with the amides of these acids, the alkali metal derivatives (e.g., sodium, potassium and lithium), the alkaline earth metal derivatives (e.g., magnesium, calcium, barium and strontium), and ammonium salts of these acids, the partial alkyl esters (e.g., methyl, ethyl, propyl, butyl, mono esters), the salts of said partial alkyl esters, and the substituted amides of these polycarboxylic acids or a variety of other different monomers. Where a hydrophilic polycarboxylic acid such as maleic acid is used as one of the starting components to form the copolymer, a hydrophobic comonomer may be used, as for example, styrene, alpha-methylstyrene, vinyl toluene, chlorostyrene, vinyl acetate, vinyl chloride, vinyl formate, vinyl alkyl ethers, alkyl acrylates, akyl methacrylates, ethylene, propylene, and/or isobutylene. The foregoing synthetic copolymers are preferably obtained by reacting equimolar proportions of a polycarboxylic acid and at least one other monomer. However, certain of the unsaturated polycarboxylic acids can be polymerized in less than equimolar proportions with some of the less hydrophobic comonomers.

A variety of other anionic polymeric substances may be employed such as hydrolyzed polyacrylonitrile-sodium salt thereof, sodium carboxymethyl cellulose, the sodium salt of an acid-ester of starch, the sodium salt of a sulfonated polystyrene, phosphorylated starches, such as those obtained by treating corn strach with phosphorus oxychloride in pyridine, anionic polysaccharides, and combinations of any of the above or other anionic coagulant materials.

Another class of anionic materials particularly suitable in the practice of the invention are copolymers of sodium acrylate and acrylamide. The most preferred copolymers of this type comprise 5–95% by weight of sodium polyacrylate and 5–95% by weight of polyacrylamide and have a molecular weight in excess of 100,000. Other polymers or copolymers of acrylic acid types are particularly preferred and are typified by those obtained by vinyl polymerization of acrylic acid, methacrylic acid, sulfoethyl acrylate, carboxyethyl acrylate or salts thereof or copolymers thereof of the acids or salts obtained by suitable copolymerization with monomers such as acrylamide, methacrylamide, acrylonitrile, methacrylonitrile, lower alkyl esters, alkyl esters of the acrylic acids, vinyl alkyl ethers, and the like.

Another greatly preferred class of anionic polymers is a linear high molecular weight polymer or copolymer of a vinyl aryl hydrocarbon, such as styrene, vinyl toluene, alpha-methylstyrene, vinyl xylene or the like, which are polymerized and then sulfonated under controlled conditions to produce a water-soluble substantially linear polymer sulfonate.

Inorganic anionic coagulants include materials such as finely divided clay, fuller's earth, bentonite type materials such as hectorite, activated carbon, activated silica, etc.

As mentioned above, one of the most preferred anionic coagulants falling within the scope of the invention are copolymers of polyacrylate sodium salt and polyacrylamide of varying proportions of the respective monomers. The examples below illustrate typical preparations of these particularly useful anionic copolymers which may be employed in the second treating stage in conjunction with laminar flow.

*Example I*

This example illustrates a typical preparation of an anionic copolymer useful in the invention. The copolymeric product contained 85 mole percent acrylamide and 15 mole percent sodium salt of acrylic acid.

27 parts of acrylic acid were dissolved in 72 parts of water. 56 parts by weight of a 50% solution of sodium hydroxide were added to the acrylic acid solution at a temperature below 35° C. The pH of the solution at this point was approximately 7–9. 153 parts by weight of acrylamide were then added to the solution and mixed until thoroughly dissolved at a temperature of 20–30° C. 72 parts of additional water were added and the monomer pH adjusted to approximately 8.5. In the reaction vessel itself, 575.0 parts by weight of toluene and 19.6 parts by weight of sorbitan monooleate were dissolved and heated to 70° C. 7.8 parts of a 1% aqueous solution of potassium persulfate were added with stirring to the monomer solution. This was followed by addition of 3.2 parts of a 1% solution of sodium metabisulfite. The monomer solution containing the above redox catalyst system was added to the toluene solution and temperature increased to 75° C. The atmosphere above the reaction vessel was purged with nitrogen and an exothermic reaction then took place. After the exothermic reaction ceased, the mixture was cooled to 63° C. While still under a nitrogen purge, 15.6 parts of a 1.15% solution of azobisisobutyronitrile in toluene was added to the reaction mixture. The nitrogen purge was continued at 63° C., until another exothermic reaction was completed. The completion of this second exothermic reaction occurred approximately 30 minutes after its initiation. Water was then distilled out of the reaction vessel by an azeotropic distillation technique, and the product isolated by filtration. A 1% solution of the resultant copolymer had a viscosity of 4200 cps.

*Example II*

This example illustrates preparation of another representative anionic copolymer. The particular copolymer was comprised of 30 mole percent sodium acrylate monomer and 70 mole percent acrylamide.

27 parts by weight of acrylic acid was dissolved in 72 parts by weight of water and cooled to a temperature below 35° C. The above solution temperature was maintained while neutralization with sodium hydroxide was effected. 30 parts by weight of a 50% solution of sodium hydroxide was necessary to carry out this step. A solution pH of 7–9 was reached after neutralization.

63 parts by weight of acrylamide were then added to the above solution and mixed until dissolved at a solution temperature of 20–30° C. 33 additional parts by weight of water were added and the pH of the monomer solution adjusted to 8.5. 0.8 part of a 1% solution of potassium persulfate were added with stirring to the monomer solution. This was followed by addition of 3.2 parts of a 1% solution of sodium metabisulfite. Into the reaction vessel itself was added 575.0 parts by weight of toluene and 19.6 parts by weight of sorbitan monooleate nonionic emulsifier. To the toluene solution was added the monomer solution and the temperature increased to 75° C. The reaction vessel was purged with nitrogen and an exothermic reaction was then initiated. After the exothermic reaction had ceased, the mixture was cooled to 63° C. and additional catalyst was added. Specifically, 15.6 parts of a 1.15% solution of azobisisobutyronitrile in toluene solution was added to the reaction mixture. The nitrogen purge was continued and temperature held at 63° C. until another exothermic reaction was completed (approximately 30 minutes after initiation). After the second exothermic reaction, water was distilled off by azeotropic distillation, and the solid product isolated by filtration. A 1% solution of the final copolymeric composition had a viscosity of 22,500 cps.

*Example III*

This example illustrates preparation of yet another typical copolymer of the anionic type. The product copolymer was comprised of 52 mole percent acrylamide and 48 mole percent sodium salt of acrylic acid.

A monomer solution was made as follows:

234.72 pounds of soft water was added to 4.8 pounds of acrylic acid. 28.56 pounds of a 50% solution of sodium hydroxide was then added to the acrylic acid solution while maintaining the solution temperature below 95° F. with external cooling water to prevent premature polymerization and crosslinking. When the pH of the solution reached 7–8, 27.0 pounds of acrylamide was added to the monomer solution and dissolved by heating with steam at 68° F., and allowed to mix for 3–5 minutes. The above monomer solution was added to a reaction vessel containing 38.7 pounds of toluene and 3.2 pounds of sorbitan monooleate non-ionic emulsifier. The reaction mixture was heated to 155° F., and purged with nitrogen. At this point, an exothermic reaction was initiated at approximately a 167° F. reaction temperature. Thirty minutes after the initial exotherm the reaction was considered complete. The reaction mixture was then heated with steam to 190° F. in order to distill off water by an azeotropic technique. The reactor was then cooled, toluene stripped off, and solid copolymer removed. A 1% aqueous solution of the copolymeric product had a viscosity of 23,000 cps.

*Example IV*

In this example, a copolymeric product was prepared which contained 95 mole percent acrylic acid salt and 5 mole percent acrylamide.

To 17.4 pounds of water were added 11.4 pounds of acrylic acid which was then neutralized with 12.35 pounds of 50% solution sodium hydroxide until a pH of 8.3 was reached. The neutralization was carried out at a temperature below 30° C. 0.6 pound of acrylamide were then added, and the monomer solution makeup completed by addition of .276 pound of potassium persulfate and 1.1 pounds of sodium bisulfite. The monomer solution was then added to a reaction vessel containing 100 pounds of toluene and 3.4 pounds of a non-ionic emulsifier. The polymerization reaction was carried out at a temperature ranging from about 70° C. to about 100° C. At the end of the reaction, water was removed by azeotropic distillation and a solid product recovered. A 1% solution of the product had a viscosity of 30,500 cps.

Again, other anionic coagulants than those specifically described above may be utilized just as effectively for purposes of the instant invention. The above are meant to merely illustrate typical anionic-type materials.

The process of the invention is particularly suitable when practiced upon sewage or dilute aqueous mixtures of waste from households and industry. Such aqueous fluids contain waste of all types such as fecal matter and the like. Included in a treatment program of sewage liquids are municipal sewages, effluents from septic tanks, cesspools and the like from individual waste sewer systems, industrial waste, raw water supplies, etc.

In order to determine the efficacy of the ivention, the following experimental work was carried out involving both large and small scale equipment.

*Example V*

This test run was carried out at an actual plant designed to coagulate raw municipal sewage. The turbulent and laminar zones specifically consisted of two banks of "pre-aeration" tanks, the first being a turbulent zone 10 feet deep, 14 feet wide, and 17 feet long, with the second being a laminar zone and having the same dimensions with the exception that the length was 65 feet. The total residence time in these zones was approximately 2¼ hours. The sewage was first treated with 1–5 p.p.m. of a cationic polyamine copolymer derived from reaction of ammonia and ethylene dichloride and having a molecular weight within a range of 20,000–50,000. The cationic was added to a zone of turbulent flow having a calculated Reynolds number of 18,000 and a Power number of 0.8. The average flow through this zone or container was 900 gallons per minute. Agitation was created by air flow at an approximate rate of 100 ft.$^3$/min.–175 ft.$^3$/min. The air itself was created by means of a turbine compressor having a theoretical horsepower of approximately 65 at the point of compression. The air was filtered through a series of orifices at the bottom of the tank and along the sides. The point shown in Area A of the graph of the drawing (corresponding to the above Reynolds and Power numbers) fell well within the turbulent flow region necessary for efficient coagulation in conjoint use with a cationic coagulant.

The already cationically treated, partially coagulated sewage was then transferred to a settling tank wherein it was treated with 0.1–0.5 p.m.m. of a 50—50 copolymer of sodium polyacrylate and polyacrylamide having a molecular weight of approximately 5 million. The anionic treated sewage was subjected to laminar flow as measured by a Reynolds number of 600 and a Power number of 1.25. This point is shown in Area B of the graph of the drawing which falls within the laminar zone of flow. The agitation itself was created by hydraulic power from pumps. The residence time in this zone was approximately two hours.

Excellent separation of suspended solids from aqueous suspending fluid was noted by employing the above process variants. Moreover the time of coagulation was materially reduced over than when compared to prior art coagulation processes. No other problems occurred, and the resolution of suspended solids from the raw sewage was considered to be excellent and quite acceptable.

It was noted in the above trial that unacceptable results, as least relative to the above, were achieved when reverse coagulant addition was carried out, that its, anionic followed by cationic treatment, or conversely when cationic treatment was followed by subjecting the thus treated polymer to laminar rather than turbulent flow or, alternatively, following anionic treatment with turbulent rather than laminar flow. By mixing the variables of coagulant addition and flow in any other manner other than that taught here, 2–3 fold less efficient results were achieved in terms of any one or more of the following; poorer resolution, slower settling of agglomerated solids, formation of an undesirable sticky mass rather than a dense, compact, easily settled floc, and creation of a light floating mass of sludge difficult to separate from the water body.

*Example VI*

In this series of laboratory experiments turbid river water was employed as the test media. After addition of chemical the treated water was agitated to varying degrees with a 2-blade agitator in a non-baffled container. In this system the transition zone defined by the graph of the drawing as measured by a Reynolds number range of 2,000–5,000 respectively corresponded to 45–112 r.p.m. of the agitator blade. Results in terms of process efficiency were measured by measuring turbidity of the subnatant liquid expressed as $SiO_2$ turbidity (Hellige) by means of a phototester cell.

In the first experiment, illustrating the ideal situation, that is carrying out the process of the invention, an ammonia-ethylene dichloride polyamine coagulant in a dosage of 3 p.p.m. was added to the raw water. The cationically-treated water was then subjected to turbulent flow and in this case agitation created by a 200 r.p.m. force of the 2-blade agitator (Reynolds number 17,000 and Power number 1.90). This agitation was maintained for four minutes. This treatment was then followed by anionic coagulant addition in the environment of laminar flow. Specifically, a 50—50 copolymer of sodium polyacrylate and polyacrylamide (molecular weight of 5 million) at a dosage of 0.25 p.p.m. was added to the already cationically-treated, partially coagulated water. Subsequent to anionic addition the water was subjected to a 40 r.p.m. agitation (laminar flow) for 10–15 minutes (Reynolds number 900 and Power number 1.75). After an approximate 30 minutes settling time, turbidities were measured. In the case of chemical treatment as outlined above, a 37 p.p.m. $SiO_2$ turbidity was realized. This was compared to a blank run (absence of cationic-anionic chemical treatment) in which the subnatant liquid had a measured turbidity of 107 p.p.m. as $SiO_2$.

The same chemicals and sequence of treatment were followed in this specific run with the exception that a transition flow, as defined by the middle portion of the graph of the drawing was employed in each case following addition of chemical. Specifically, the cationic was added first followed by agitation at 90 r.p.m. for four minutes, in turn followed by anionic treatment for 10–15 minutes, again at a 90 r.p.m. flow. With benefit of this treatment, turbidity of the subnatant sample after the same standing period as above was 72 p.p.m. expressed as $SiO_2$, compared to a blank of 107 p.p.m. Thus, it can be seen that the type of flow as defined in the transition zone of the graph should be avoided and if employed gives an approximate 2-fold less efficiency than the proper sequence of cationic treatment followed by turbulent flow, in turn followed by anionic treatment and laminar flow.

In this particular run, reverse order of addition of coagulants was effected. That is, the anionic coagulant was added first, followed by turbulent flow and specifically 200 r.p.m. agitation for four minutes, which steps in turn were followed by cationic treatment of the water and a 40 r.p.m. agitation for 10–15 minutes. In this case, the resultant subnatant sample had a turbidity of 62 p.p.m. expressed as $SiO_2$ again compared to a blank of 107 p.p.m. Again, it can be readily seen that almost a 2-fold less efficient treatment in terms of clarity of sample is realized when improper sequence of addition of respective coagulants is effected. It is extremely important in the practice of the invention that the cationic addition be followed by anionic treatment, and not vice-versa. As well, the cationic treatment must be followed by turbulent flow and anionic treatment by laminar flow to achieve fruition of optimum coagulation efficiency of low turbidity waters.

In this experiment, the cationic polymer was added, followed by 200 r.p.m. treatment in accordance with the teachings of the invention. However, the anionic treatment was followed by a flow within the transition zone of the graph of the drawing, and specifically blade agitation at 100 r.p.m. In this case, approximately 50–75% less efficiency in terms of less clarity of the subnatant sample was noted when compared to results obtained by following the practice of the invention.

The residence times in turbulent and laminar zones for any particular volume turbid water under treatment may vary over considerable durations of time according to the equipment involved, type of suspension, specific agitation within the zone of turbulent and laminar flow, etc. However, it has been discovered that generally residence times in the zone of turbulent flow range from about 1 minute to about 4 hours and more often from 2 minutes to about 2 hours. Likewise, the residence time of treated material subjected to laminar flow ranges from about ¼ hour to about 5 hours and more generally from about ½ hour to about 3 hours.

From the foregoing process of the invention, it will be readily understood that numerous modifications and changes will readily occur to those skilled in the art after consideration of the specification and the accompanying claims. Such minor modifications or substantial equivalents as may occur to one skilled in the art provided with the benefit of our disclosure are included within the scope of our claims.

We claim as our invention:

1. A method of optimizing the efficiency of coagulation of low turbidity water via treatment thereof with chemical additives which comprises the sequential steps of first adding in at least a coagulation inducing dosage a chemical additive having at least one site of cationic charge to said water having suspended therein 15–30,000 p.p.m. of solids, subjecting said cationic-treated water to a zone of turbulent flow as defined by the parameters of the graph of the drawing of points lying within Area A, subsequentially further adding a second chemical additive to said partially coagulated water to complete said coagulation, said second added chemical possessing at least one site of anionic charge, subjecting the anionic-treated water to a second zone of laminar flow as defined by the parameters of the graph of the drawing of points lying within Area B, and separating the thus coagulated solids from the water.

2. The method of claim 1 wherein said low turbidity water is sewage.

3. The method of claim 1 wherein said cationic treatment agent is added in an amount of 0.05–100 p.p.m., and said anionic treating agent is added in an amount of 0.05–25 p.p.m.

4. The method of claim 1 wherein said cationic treatment agent is a polymeric polyamine composition comprising a epihalohydrin-alkylene polyamine condensation copolymer having a molecular weight of at least 1,000, said copolymer being further characterized as having a solution viscosity of at least 10 cps. when measured at 75° F. as an aqueous solution containing 20% by weight of said condensation copolymer, and said anionic treatment agent is a copolymer comprising 5–95% by weight of sodium polyacrylate and 5–95% by weight of polyacrylamide, said anionic copolymer having a molecular weight of at least 100,000.

5. The method of claim 1 wherein said cationic treating agent is a condensation copolymer of ammonia and ethylene dichloride having a molecular weight of at least 1,000 and said anionic treating agent is a copolymer comprising 5–95% by weight of sodium polyacrylate and 5–95% by weight of polyacrylamide, said anionic copolymer having a molecular weight of at least 100,000.

6. The method of claim 1 wherein said cationic treating agent is ferric chloride and said anionic treating agent is a copolymer comprising 5–95% by weight of sodium polyacrylate and 5–95% by weight of polyacrylamide, said anionic copolymer having a molecular weight of at least 100,000.

7. The method of claim 1 wherein said cationic treating agent is an epihalohydrin-alkylene polyamine condensation polymer, said copolymer being further characterized as having a viscosity of at least 10 cps., when measured at 75° F. as an aqueous solution containing 20% by weight of said condensation copolymer, and said anionic treating agent is a sulfonated linear polystyrene having a molecular weight of at least 100,000.

8. The method of claim 1 wherein said cationic treating agent is a copolymer of ammonia and ethylene dichloride having a molecular weight of at least 1,000 and said anionic treating agent is a sulfonated linear polystyrene having a molecular weight of at least 100,000.

9. The method of claim 1 wherein said cationic treating agent is ferric chloride and said anionic treating agent is a sulfonated linear polystyrene having a molecular weight of at least 100,000.

References Cited

UNITED STATES PATENTS

| 3,142,638 | 7/1964  | Blaisdell et al. | 210—53 X |
| 3,157,594 | 11/1964 | Nevers          | 210—53   |

FOREIGN PATENTS

| 648,242 | 9/1962 | Canada. |

MICHAEL E. ROGERS, *Primary Examiner.*

UNITED STATES PATENT OFFICE
CERTIFICATE OF CORRECTION

Patent No. 3,377,274                                          April 9, 1968

John T. Burke et al.

It is certified that error appears in the above identified patent and that said Letters Patent are hereby corrected as shown below:

Column 11, formula 12, that portion of the formula reading "-$CO-CH_2$-" should read -- -$CH-CH_2$- --. Column 16, line 9, "than" should read -- that --.

Signed and sealed this 25th day of November 1969.

(SEAL)
Attest:

Edward M. Fletcher, Jr.                              WILLIAM E. SCHUYLER, JR.
Attesting Officer                                               Commissioner of Patents